United States Patent
Schwagmeyer et al.

(10) Patent No.: US 12,365,318 B2
(45) Date of Patent: Jul. 22, 2025

(54) METHOD FOR CONTROLLING A BRAKE SYSTEM, BRAKE SYSTEM, AND VEHICLE COMBINATION

(71) Applicant: ZF CV Systems Global GmbH, Bern (CH)

(72) Inventors: Florian Schwagmeyer, Uetze-Dollbergen (DE); Henrik Wiechert, Springe (DE)

(73) Assignee: ZF CV Systems Global GmbH, Bern (CH)

( * ) Notice: Subject to any disclaimer, the term of this patent is extended or adjusted under 35 U.S.C. 154(b) by 127 days.

(21) Appl. No.: 18/488,820

(22) Filed: Oct. 17, 2023

(65) Prior Publication Data
US 2024/0157920 A1    May 16, 2024

(30) Foreign Application Priority Data
Nov. 14, 2022   (DE) .................. 10 2022 129 979.1

(51) Int. Cl.
*B60T 8/24*      (2006.01)
*B60T 8/17*      (2006.01)
(Continued)

(52) U.S. Cl.
CPC ............ *B60T 8/248* (2013.01); *B60T 8/1708* (2013.01); *B60T 8/1755* (2013.01);
(Continued)

(58) Field of Classification Search
CPC .... B60T 7/08–108; B60T 7/20; B60T 8/1708; B60T 8/1755; B60T 8/248;
(Continued)

(56) References Cited

U.S. PATENT DOCUMENTS

| | | |
|---|---|---|
| 2010/0252378 A1 | 10/2010 | Hilberer |
| 2022/0297647 A1* | 9/2022 | Dieckmann ............. B60T 8/321 |
| 2023/0303045 A1* | 9/2023 | Klostermann ........ B60T 13/683 |

FOREIGN PATENT DOCUMENTS

| | | | | |
|---|---|---|---|---|
| DE | 10 2007 042 316 A1 | | 5/2008 | |
| DE | 102020132722 A1 | * | 6/2022 | ............ B60T 13/263 |

(Continued)

*Primary Examiner* — Phutthiwat Wongwian
*Assistant Examiner* — Mark L. Greene
(74) *Attorney, Agent, or Firm* — Walter Ottesen, P.A.

(57) ABSTRACT

A method controls a brake system of a vehicle combination. The switching valve in the second setting (anti-jackknifing braking function active) outputs a reservoir pressure into a trailer pressure line to actuate the trailer service brakes dependent on the anti-jackknifing braking demand. When service braking demand and anti-jackknifing braking demand are simultaneously present, an anti-jackknifing and a service braking ratio value are determined, a switchover criterion is checked dependent on the ratio values. The criterion is satisfied if the service braking ratio value exceeds a specified fraction of the anti-jackknifing braking ratio value when the anti-jackknifing braking function is active and falls below the specified fraction when the anti-jackknifing braking function is inactive; and, if the criterion is satisfied, the switching valve is switched over to activate the anti-jackknifing braking function and implement the anti-jackknifing braking demand, or to deactivate the anti-jackknifing braking function and implement the service braking demand.

19 Claims, 2 Drawing Sheets

(51) Int. Cl.
*B60T 8/1755* (2006.01)
*B60T 13/68* (2006.01)
*B60T 7/08* (2006.01)

(52) U.S. Cl.
CPC ............... *B60T 13/683* (2013.01); *B60T 7/08* (2013.01); *B60T 2270/10* (2013.01)

(58) Field of Classification Search
CPC .... B60T 8/323; B60T 13/683; B60T 2230/06; B60T 2270/10
See application file for complete search history.

(56) References Cited

FOREIGN PATENT DOCUMENTS

| | | |
|---|---|---|
| EP | 2 108 555 A2 | 10/2009 |
| EP | 2 123 528 A2 | 11/2009 |
| WO | 2009/019022 A2 | 2/2009 |
| WO | 2016/169970 A1 | 10/2016 |
| WO | WO-2021110642 A1 * | 6/2021 ............ B60T 13/665 |

* cited by examiner

METHOD FOR CONTROLLING A BRAKE SYSTEM, BRAKE SYSTEM, AND VEHICLE COMBINATION

CROSS-REFERENCE TO RELATED APPLICATIONS

This application claims priority of German patent application no. 10 2022 129 979.1, filed Nov. 14, 2022, the entire content of which is incorporated herein by reference.

TECHNICAL FIELD

The disclosure relates to a method for controlling a brake system, to a brake system, and to a vehicle combination having such a brake system.

BACKGROUND

In vehicle combinations having a tractor vehicle and a trailer, it is known that, in the context of an anti-jackknifing braking function, the trailer is braked with greater intensity than the tractor vehicle in order to prevent the trailer from overrunning the tractor vehicle and to thus prevent unstable situations. Exemplary implementations of such an anti-jackknifing braking function are described in EP 2 123 528 A2, DE 10 2007 042 316 A1, US 2010/0252378 A1 or WO 2016169970 A1.

In ABS-type pneumatic brake systems, in which a service braking brake pressure specified by the driver using a service brake valve is input, with an air flow rate boosted by means of a relay valve, into a front-axle pressure line that is connected to the front-axle service brakes, an anti-jackknifing braking function can be implemented by virtue of the connection between the front-axle pressure line and the service brake valve being shut off by means of a switching valve, and a connection to a reservoir being produced by means of the switching valve instead. A reservoir pressure of the reservoir then prevails in the front-axle pressure line, which via a trailer pressure line is also connected to a trailer control valve. In order that the reservoir pressure is not output to the front-axle service brakes, ABS valves arranged in the front-axle pressure line are, beforehand, moved into a pressure-maintaining setting (inlet valve and outlet valves are closed) such that the service braking brake pressure prevailing in the front-axle pressure line prior to the pressurization with the reservoir pressure is maintained at the front-axle service brakes.

Through corresponding modulation of the reservoir pressure, a trailer brake pressure required for the anti-jackknifing braking function can be set and output via the trailer control valve to the trailer service brakes. The trailer is thereupon braked with greater intensity independently of the tractor vehicle, and the vehicle combination is thus straightened.

A disadvantage here is that, in situations in which the driver actuates the service brake valve, the vehicle combination cannot be braked by way of a changed braking action at the front-axle service brakes, because the pneumatic connection between the service brake valve and the front-axle service brakes is shut off while an anti-jackknifing braking function is active, and the ABS valves also remain in the maintaining setting. Thus, in such an ABS brake system, the similarly specified service braking brake pressure does not reach the front-axle service brakes, and thus the tractor vehicle is braked at most by means of the rear-axle service brakes.

If the anti-jackknifing braking function is manually deactivated in such situations, it can occur that the vehicle combination is abruptly braked, because in that situation the switching valve and the ABS valves are correspondingly switched back again (ABS: outlet valve fully closed, inlet valve fully opened). The service braking brake pressure that is similarly output to the front-axle service brakes then abruptly changes, which in the case of large pressure differences confuses the driver and can furthermore lead to situations that are critical in terms of stability.

EP 2 108 555 A2 furthermore describes that an anti-jackknifing braking function, after being activated, can be controlled by way of the service brake valve using an anti-jackknifing braking activation element, for example a switch or a pushbutton. Accordingly, an anti-jackknifing braking demand is specified by means of the service brake valve, and the trailer is braked in accordance with the actuation of the service brake valve in order to straighten the vehicle combination. Here, after the anti-jackknifing braking function is activated, a degree of suppression for the rear-axle service brakes and optionally also the front-axle service brakes of the tractor vehicle may additionally be set, this being implemented by actuation of a switching valve (shut-off solenoid valve) by which a specified pressure is not output, or is output only in throttled fashion, to the service brakes in the tractor vehicle. Accordingly, depending on the set degree of suppression, the tractor vehicle is not braked, or is braked only to a small degree, during an anti-jackknifing braking operation. If service braking of the vehicle combination as a whole is desired, the anti-jackknifing braking function must be deactivated by means of the anti-jackknifing braking activation element, such that the same service brake valve can subsequently be used again for suppression-free actuation of the service brakes both in the tractor vehicle and in the trailer in order to implement a service braking setpoint deceleration specified by the driver. Here, a transition may be implemented such that the switching valve (shut-off solenoid valve) ends the suppression of the service brakes not abruptly but by way of targeted pulsed opening and closing of the switching valve.

SUMMARY

It is an object of the disclosure to specify a method, a brake system and a vehicle combination via which safe and comfortable operation of the vehicle combination can be made possible with an implemented anti-jackknifing braking function.

The object is achieved via a method, a brake system and a vehicle combination according to the disclosure.

Accordingly, in a method for controlling a brake system of a vehicle combination composed of a tractor vehicle and a trailer, provision is made whereby,
  in the presence of a service braking demand and an anti-jackknifing braking demand simultaneously,
  an anti-jackknifing braking ratio value and a service braking ratio value are ascertained, wherein the anti-jackknifing braking ratio value is formed in a manner dependent on the anti-jackknifing braking demand and the service braking ratio value is formed in a manner dependent on the service braking demand;
  a switchover criterion is checked in a manner dependent on the ascertained ratio values, wherein the switchover criterion is satisfied if the service braking ratio value exceeds a specified fraction of the anti-jackknifing braking ratio value when the anti-jackknifing braking function is active and falls below the specified fraction when the anti-jackknifing braking function is inactive, that is, the service braking ratio value deviates from the anti-jackknifing braking ratio value by no more than a percentage; and, if the switchover criterion is satisfied, the switching valve, for example 3/2 directional valve, is switched over from a first switching setting (inactive anti-jackknifing braking function) into the second switching setting in order to activate the anti-jackknifing braking function and implement the anti-jackknifing braking demand, or from the second switching setting (active anti-jackknifing braking function) into the first switching setting in order to deactivate the anti-jackknifing braking function and implement the service braking demand.

Also provided according to the disclosure are a brake system for a vehicle combination composed of a tractor vehicle and a trailer, having a control unit for implementing the method, and a vehicle combination having such a brake system.

It has thus advantageously been identified that, in a brake system, in particular an ABS-type brake system, in which a service braking demand can be received by means of a service brake valve and an anti-jackknifing braking demand can be received by means of an anti-jackknifing braking operator control unit, for example a continuously variably settable anti-jackknifing braking operator control lever, which is distinct from the service brake valve, an activation and a deactivation of the anti-jackknifing braking function in the simultaneous presence of a service braking demand can be made safer and more comfortable if the two present demands are compared with one another or set in a ratio with respect to one another. This is performed against the background that, when the switching valve is switched over, resulting in a correspondingly changed actuation of the ABS valves upstream of the front-axle service brakes, a different intermediate pressure acts at the front-axle service brakes, whereby the driving dynamics of the vehicle combination also change. This is allowed up to a certain degree, wherein the degree is defined by the maximum fraction or percentage by which the two ratio values may deviate from one another. Here, the fraction or percentage is defined such that the switchover takes place not only in the presence of identical values (100%), and at the same time the switchover does not give rise to an excessive difference in deceleration.

A service braking ratio value, which characterizes the service braking demand, of for example at least half (with a defined fraction of 0.5 or percentage of 50%) of the anti-jackknifing braking ratio value, which characterizes the anti-jackknifing braking demand, is thus allowed for a switchover of the switching valve, whereas a switchover is not allowed in the presence of lower service braking ratio values, because this would result in an excessive difference in deceleration. Thus, if for example a service braking target pressure of 2 bar is output to the relevant service brakes in the tractor vehicle and in the trailer on the basis of the service braking demand, then a switchover of the switching valve is allowed only if the anti-jackknifing braking target pressure, which is already being output and which arises from the anti-jackknifing braking demand, is no more the 4 bar. This applies correspondingly to other selected ratios, for example of between 0.2 and 0.8, or other selected percentages, for example of between 20% and 80%.

Provision is preferably furthermore made whereby, in the presence of a service braking demand and an anti-jackknifing braking demand simultaneously, and with the anti-jackknifing braking function active, in the tractor vehicle only the rear-axle service brakes are pneumatically actuated in a manner dependent on the service braking demand. Thus, while the front-axle service brakes, in the second switching setting with an anti-jackknifing braking function active, cannot be pneumatically actuated in a manner dependent on the service braking demand owing to the pressure-maintaining setting having been set, this is not the case for the rear-axle service brakes, which can consequently continue to unaffectedly implement the service braking demand.

When an anti-jackknifing braking function is active, the trailer service brakes are merely utilized to implement the service braking demand according to the situation, wherein, by means of the switching valve in the second switching setting, a reservoir pressure prevailing in a reservoir is output via the front-axle pressure line into a trailer pressure line that leads to a trailer control valve, in order to pneumatically actuate the trailer service brakes in a manner dependent on the received anti-jackknifing braking demand. For this purpose, provision is preferably made whereby the reservoir pressure which, when the switching valve is in the second switching setting, is output via the front-axle pressure line into the trailer pressure line that leads to the trailer control valve is modulated in accordance with the anti-jackknifing braking demand, preferably by means of a valve module arranged in the trailer pressure line. A select-high function is then implemented in the trailer control valve, for example in the form of a select-high valve which outputs either the reservoir pressure modulated in a manner dependent on the anti-jackknifing braking demand (trailer service braking brake pressure), or the pressure output in a manner dependent on the service braking demand (for example rear-axle control pressure), to the trailer, depending on which is the higher pressure.

Thus, if the service braking ratio value is lower than the maximum allowable fraction of the anti-jackknifing braking ratio value, the front-axle service brakes and the trailer service brakes remain uninfluenced by the service braking demand when the service brake valve is actuated and the anti-jackknifing braking function is active, while this is not the case for the rear-axle service brakes.

Provision is preferably furthermore made whereby, when the switching valve is in the first switching setting, with the anti-jackknifing braking function inactive, a front-axle control pressure, which is output by the service brake valve on the basis of the service braking demand, is output with a boosted air flow rate into the front-axle pressure line and into the trailer pressure line that leads to the trailer control valve, while the ABS valves, which are in each case connected upstream of the front-axle service brakes of the tractor vehicle in the front-axle pressure line, have been moved into a pressure build-up setting if no ABS control operation is taking place. The actuation of the front-wheel/front-axle service brakes that is conventional in an ABS system is thus resorted to when no anti-jackknifing braking operation is being performed.

Provision is preferably furthermore made whereby the ABS valves, which are in each case connected upstream of the front-axle service brakes, can in each case be moved into the pressure-maintaining setting in order to maintain an intermediate pressure that prevails in a sub-region of the front-axle pressure line between the relevant ABS valve and the relevant front-axle service brakes; or be moved into a pressure dissipation setting in order to reduce the intermediate pressure, for example to an ambient pressure; or be moved into a pressure build-up setting in order to adapt the intermediate pressure to the pressure that is output by the switching valve into the front-axle pressure line. This is possible for example with ABS valves that have an inlet valve/outlet valve combination.

On this basis, provision is then preferably made whereby, before or after the switching valve is switched over from the first switching setting, with the anti-jackknifing braking function inactive, into the second switching setting in order to activate the anti-jackknifing braking function, the ABS valves, which are in each case connected upstream of the front-axle service brakes, are moved alternately or in pulsed fashion into the pressure dissipation setting and the pressure-maintaining setting in order to reduce the intermediate pressure, which acts at the front-axle service brakes, continuously or with a specified pressure gradient (to the ambient pressure), wherein the pressure-maintaining setting is subsequently held for as long as the second switching setting of the switching valve is set, or, as or after the switching valve is switched over from the second switching setting, with the anti-jackknifing braking function active, into the first switching setting in order to deactivate the anti-jackknifing braking function, the ABS valves, which are in each case connected upstream of the front-axle service brakes, are moved alternately or in pulsed fashion into the pressure build-up setting and the pressure-maintaining setting in order to increase the intermediate pressure, which acts at the front-axle service brakes, with a specified pressure gradient.

The existing ABS valves at the front axle are thus utilized for making the pressure difference or deceleration difference, which results from the switching of the switching valve and which is already limited in any case by the defined fraction, as comfortable and safe as possible. There is then no abrupt change in pressure or change in deceleration, but rather a continuous change in pressure with the respectively defined pressure gradient.

Here, provision is preferably additionally made whereby the ABS valves are moved into the pressure dissipation setting for a pulse time and into the pressure-maintaining setting for an interval time, with this preferably being performed several times in succession, in order to reduce the intermediate pressure, which acts at the front-axle service brakes, with the specified pressure gradient, or are moved into the pressure build-up setting for a pulse time and into the pressure-maintaining setting for an interval time, with this also preferably being performed several times in succession, in order to increase the intermediate pressure, which acts at the front-axle service brakes, with the specified pressure gradient.

A specific pressure change can thus be effected in a controlled manner, wherein, for this purpose, provision is preferably made whereby a relationship between the respective pressure gradient and the pulse times and the interval times is stored in a pulse characteristic curve, which may for example be taught in advance.

Provision is preferably furthermore made whereby the anti-jackknifing braking ratio value is specified by an anti-jackknifing braking actual pressure, which is output to the trailer service brakes, or by an anti-jackknifing braking target pressure or anti-jackknifing braking target value that characterizes the anti-jackknifing braking demand, wherein the anti-jackknifing braking target pressure or anti-jackknifing braking target value is read out from a stored anti-jackknifing braking characteristic curve. Thus, a value is ascertained which characterizes or quantifies the anti-jackknifing braking demand in some way. Provision is then preferably similarly made whereby the service braking ratio value is specified by a service braking target pressure, which characterizes the service braking demand, or a service braking target value, wherein the service braking target pressure or service braking target value is read out from a stored service braking characteristic curve. Here, both ratio values preferably describe the same variable, such that these can then be directly compared with one another by way of the fraction, with no further conversion being necessary.

BRIEF DESCRIPTION OF DRAWINGS

The invention will now be described with reference to the drawings wherein.

DETAILED DESCRIPTION

Figure 1:
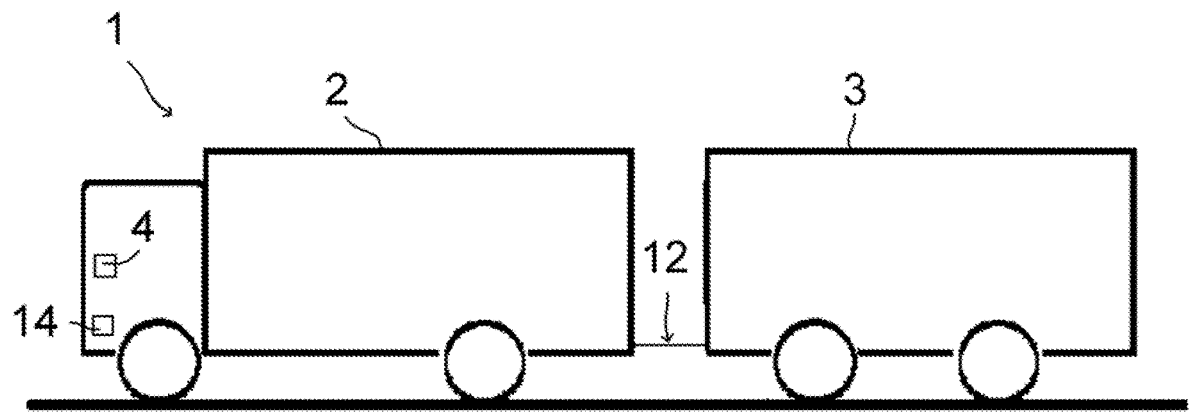
FIG. 1 shows a schematic view of a vehicle combination.

FIG. 1 illustrates a vehicle combination 1 composed of a tractor vehicle 2 and of a trailer 3 coupled to the tractor vehicle. In the context of an anti-jackknifing braking function SF, the trailer 3 can, during travel, be braked with greater intensity than the tractor vehicle 2 in order to straighten the vehicle combination 1 in certain situations. In order to implement the anti-jackknifing braking function SF, an anti-jackknifing braking operator control unit 4, for example a lever, is provided in order to receive an anti-jackknifing braking demand AS. In a manner dependent on a manual actuation of the anti-jackknifing braking operator control unit 4, an anti-jackknifing braking actuation signal SSB is generated and output in order to subsequently implement the anti-jackknifing braking function SF in accordance with the actuation. An actuation of the anti-jackknifing braking operator control unit 4, or the anti-jackknifing braking demand AS, is coded in an arbitrary manner in the anti-jackknifing braking actuation signal SSB, for example as a percentage value (0% to 100%) or a value related thereto.

Figure 2:
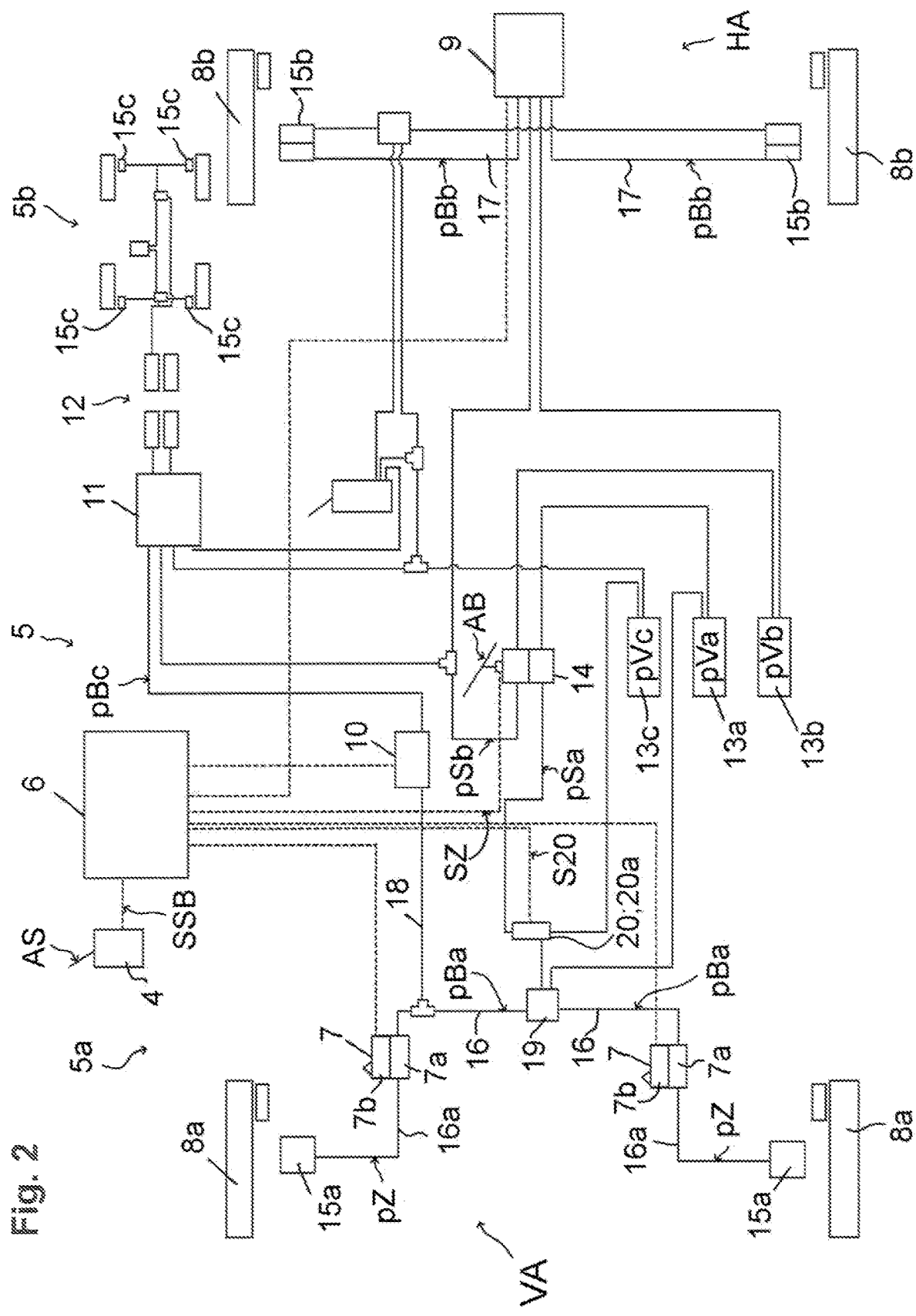
FIG. 2 shows a brake system of the vehicle combination according to FIG. 1; and, FIG. 3 shows a flow diagram of the method according to the invention.

FIG. 2 illustrates the brake system 5, which is of ABS-type configuration, in detail. According to the figure, a control unit 6 (ECU) is provided which, in the embodiment illustrated, is situated in the tractor vehicle part 5a. The anti-jackknifing braking actuation signal SSB is supplied to the control unit 6, for example as a digital signal via a bus system of the tractor vehicle 2, for example the CAN bus.

In the present brake system 5, the control unit 6 performs certain braking functions, for example ABS control or ASR control, through targeted actuation of wheel-specific ABS valves 7 (inlet valve/outlet valve combination) at the front wheels 8a of the tractor vehicle 2. ABS control at the rear wheels 8b of the tractor vehicle 2 is implemented by means of an axle modulator 9, which is likewise controlled by the control unit 6 and in which the function of the ABS valves is already integrated. The control unit 6 furthermore actuates a valve module 10 (SMV), by means of which a trailer service braking brake pressure pBc that is transmitted via a trailer control valve 11 and a trailer connector 12 to the trailer part 5b of the brake system 5 can be set.

In the tractor vehicle part 5a, the brake system 5 has three reservoirs, a first reservoir 13a, a second reservoir 13b and a third reservoir 13c, which are assigned to in each case one brake circuit (front axle VA, rear axle HA, trailer 3 and/or parking brake). Using a service brake valve 14, the driver can specify a service braking demand AB, which is implemented by pneumatic actuation of front-axle service brakes 15a and rear-axle service brakes 15b in the tractor vehicle 2 and of trailer service brakes 15c in the trailer 3. For this purpose, in a manner dependent on the service braking demand AB, the service brake valve 14 modulates an analog front-axle control pressure pSa and rear-axle control pressure pSb, from the reservoir pressure pVa, pVb of the relevant first and second reservoir 13a, 13b, in two pressure channels. The front-axle control pressure pSa is fed, by means of a relay valve 19 which boosts an air flow rate, into front-axle pressure lines 16, such that a corresponding front-axle service braking brake pressure pBa acts in the front-axle pressure lines. The rear-axle control pressure pSb serves for the pneumatic actuation of the axle modulator 9 which, via an integrated relay valve, outputs a corresponding rear-axle service braking brake pressure pBb with a boosted air flow rate into rear-axle pressure lines 17. The rear-axle control pressure pSb is furthermore also transmitted to the trailer control valve 11. An electronic service braking actuation signal SZ, which corresponds to the service braking demand AB and which for example characterizes a pedal travel, a pedal force or a pedal pressure, is furthermore transmitted to the control unit 6.

The front-axle pressure line 16 leads to the front-axle service brakes 15a, and the rear-axle pressure line 17 leads to the rear-axle service brakes 15b, such that these are pneumatically actuated in accordance with the control pressure pSa, pSb that is output in the relevant pressure channel by the service brake valve 14. Via a trailer pressure line 18, which branches off from the front-axle pressure line 16, the front-axle service braking brake pressure pBa is conducted as a trailer service braking brake pressure pBc to the trailer control valve 11 and is transmitted via the trailer connector 12 to the trailer service brakes 15c. Here, a select-high function is implemented, for example in the form of a mechanical select-high valve, in the trailer control valve 11 such that either the trailer service braking brake pressure pBc or the rear-axle control pressure pSb that is output in a manner dependent on the service braking demand AB is transmitted via the trailer connector 12 to the trailer service brakes 15c, depending on which of the two pressures pBc, pSb is the higher.

By means of the valve module 10, which is arranged in the trailer pressure line 18, the trailer service braking brake pressure pBc can be adapted or modulated in a manner controlled by the control unit 6. Through such analog pneumatic actuation of the relevant service brakes 15a, 15b, 15c with the relevant service braking brake pressure pBa, pBb, pBc, the service braking demand AB specified by the driver is implemented pneumatically.

A switching valve 20, for example a 3/2 directional valve 20a or solenoid valve, is furthermore arranged between the service brake valve 14 and the relay valve 19. Depending on switching setting S1, S2, the switching valve selectively connects either the third reservoir 13c or the service brake valve 14 to the relay valve 19. Therefore, by means of the switching valve 20, it is possible to define whether the front-axle control pressure pSa or a reservoir pressure pVc from the third reservoir 13c is boosted in terms of air flow rate by the relay valve 19. Instead of the third reservoir 13c, it would in principle also be possible for one of the other reservoirs 13a, 13b to be pneumatically connected to the switching valve 20, in order to then selectively output the relevant reservoir pressure pVa, pVb. The switching valve 20 is electrically actuated by the control unit 6 by way of a switching signal S20.

Furthermore, the two ABS valves 7 are arranged, one for each side, in the front-axle pressure line 16 in order to set the intermediate pressure pZ which prevails in the front-axle pressure line 16 in a sub-region 16a between the ABS valves 7 and the relevant front-axle service brakes 15a, and which also acts at the front-axle service brakes 15a. Accordingly, the ABS valves 7 (inlet valve/outlet valve combination) can, as is well known, be moved into a "pressure-maintaining setting" P1 (inlet valve 7a and outlet valve 7b closed) in which the front-axle service braking brake pressure pBa specified by the service brake valve 14 and output by the relay valve 19 is not output into the sub-region 16a. The intermediate pressure pZ is thus maintained. In a "pressure dissipation setting" P2 (inlet valve 7a closed and outlet valve 7b open) of the relevant ABS valve 7, the sub-region 16a is ventilated, as a result of which the intermediate pressure pZ decreases or approximates to an ambient pressure. In a "pressure build-up setting" P3 (inlet valve 7a open and outlet valve 7b closed), the ABS valve 7 allows the front-axle service braking brake pressure pBa, which is output by the service brake valve 14 and boosted in terms of air flow rate by the relay valve 19, to pass through unhindered into the sub-region 16a and thus to the front-axle service brakes 15a.

The setting of the intermediate pressure pZ serves, as described above, for example for the purposes of implementing ABS control (or ASR control) that is controlled by the control unit 6. The ABS valves 7 at the front wheels 8a are however additionally actuated by the control unit 6 even when an anti-jackknifing braking operation is demanded by means of the anti-jackknifing braking operator control unit 4. In order to implement an anti-jackknifing braking operation, the switching valve 20 is switched by the control unit 6, by way of the switching signal S20, from a first switching setting S1 into a second switching setting S2 when a corresponding anti-jackknifing braking actuation signal SSB is present. While it is the case in the first switching setting S1 that the front-axle pressure line 16 is connected, with a boosted air flow rate (by means of the relay valve 19), to the respective pressure channel of the service brake valve 14, it is the case in the second switching setting S2 that the front-axle pressure line 16 is charged, with a boosted air flow rate (by means of the relay valve 19), with the pressure of the third reservoir 13c.

In order to prevent the front-axle service brakes 15a from being charged with the reservoir pressure pVc of the third reservoir 13c when the anti-jackknifing braking function SF is carried out or when the anti-jackknifing braking demand AS is implemented, the control unit 6, before outputting the switching signal S20 to the switching valve 20, switches the ABS valves 7 at the front wheels 8a initially into the pressure dissipation setting P2, in order to reduce the intermediate pressure pZ, preferably to an ambient pressure, and subsequently into the pressure-maintaining setting P1. Therefore, when the switching valve 20 is subsequently switched over into the second switching setting S2, the reservoir pressure pVc of the third reservoir 13c is not output into the sub-region 16a. The front wheels 8a are therefore not braked when the switching valve 20 is situated in the second switching setting S2. By contrast, the braking action at the rear axle HA by means of the rear wheels 8b remains unchanged.

The reservoir pressure pVc of the third reservoir 13c then also acts in the trailer pressure line 18 and can be adapted by the control unit 6 by means of the valve module 10 in order to transmit a trailer service braking brake pressure pBc, which corresponds to the actuation of the anti-jackknifing operator control unit 4, via the trailer control valve 11 to the trailer service brakes 15c. Here, the valve module 10 modulates the trailer service braking brake pressure pBc from the reservoir pressure pVc of the third reservoir 13c such that, when the anti-jackknifing braking function SF is active in accordance with the anti-jackknifing braking demand AS, the trailer 3 is braked with greater intensity than the tractor vehicle 2.

For this purpose, an anti-jackknifing braking target pressure pSZ corresponding to the anti-jackknifing braking demand AS, or an anti-jackknifing braking target value WSZ related to the anti-jackknifing braking target pressure, is firstly calculated or ascertained in the control unit 6 from the anti-jackknifing braking actuation signal SSB of the anti-jackknifing braking operator control unit 4, for example from a stored anti-jackknifing braking characteristic curve KS or the like. These characterize the intensity with which the trailer service brakes 15c are to be braked during the present actuation of the anti-jackknifing braking operator control unit 4, in particular relative to the tractor vehicle 2, which is possibly likewise braked by means of the rear axle HA. Then, in a manner dependent on the ascertained anti-jackknifing braking target pressure pSZ or anti-jackknifing braking target value WSZ, the control unit 6 actuates the valve module 10, which thereupon modulates a trailer service braking brake pressure pBc, which ideally corresponds to the anti-jackknifing braking target pressure pSZ, from the reservoir pressure pVc of the third reservoir 13c. This may be performed by way of open-loop pressure control or closed-loop pressure control.

Figure 3:
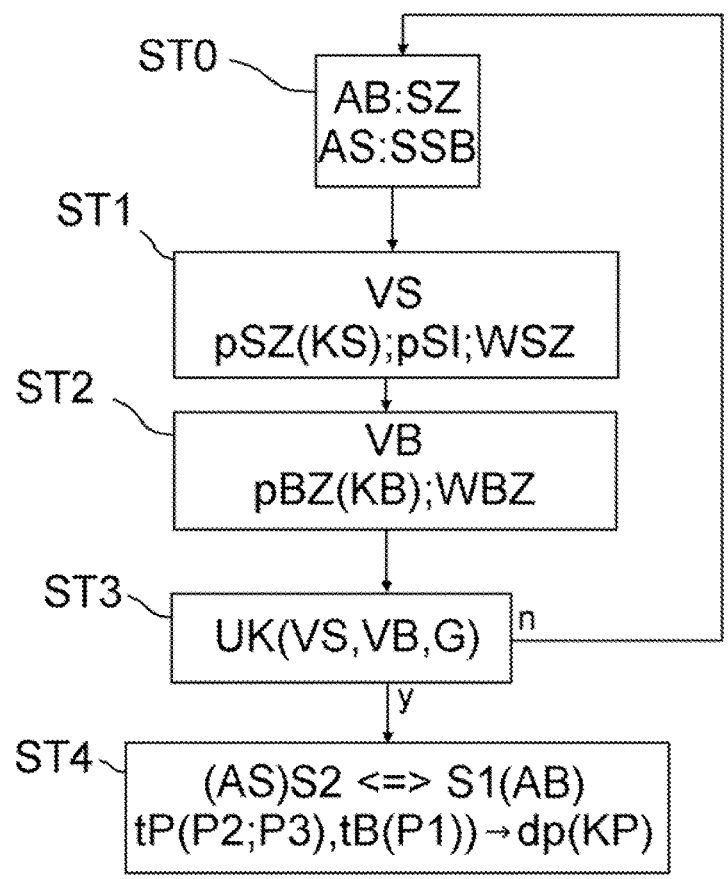

If, during an anti-jackknifing braking operation, the driver uses the service brake valve 14 to specify a particular service braking demand AB for the vehicle combination 1, then the control unit 6, or a switchover unit 6a that is implemented in the control unit 6, carries out, for example, the following steps, which are illustrated in the flow diagram in FIG. 3.

In an initial step ST0, it is checked whether the driver is actuating the service brake valve 14 and a particular service braking demand AB is thus present. This is performed in the switchover unit 6a, for example by way of an evaluation of the service braking actuation signal SZ. It is furthermore checked whether the anti-jackknifing braking operator control unit 4 has been actuated, and therefore whether the anti-jackknifing braking function SF is active or an anti-jackknifing braking demand AS is present, this being performed in the switchover unit 6a, for example by evaluation of the anti-jackknifing braking actuation signal SSB.

If both apply, then in a first step ST1, an anti-jackknifing braking ratio value VS is ascertained. This (approximately) characterizes the braking action that is imparted by means of the trailer service brakes 15c on the basis of the anti-jackknifing braking demand AS in the context of the anti-jackknifing braking function SF. The anti-jackknifing braking ratio value VS is for example the anti-jackknifing braking target pressure pSZ (or anti-jackknifing braking target value WSZ), which can be read out using the anti-jackknifing braking characteristic curve KS or the like as described above, and which is output by way of open-loop pressure control or closed-loop pressure control via the valve module 10 to the trailer control valve 11 when the anti-jackknifing braking function SF is active.

Additionally or alternatively, the anti-jackknifing braking ratio value VS may however also take the form of an anti-jackknifing braking actual pressure pSI, for example, which is directly measured by means of corresponding pressure sensors in the valve module 10 or in the trailer control valve 11 and which therefore corresponds to the trailer service braking brake pressure pBc that is actually output via the trailer control valve 11 to the trailer 3.

In a second step ST2, a service braking ratio value VB is ascertained, which approximately characterizes the braking action that is to be imparted by means of all service brakes 15a, 15b, 15c on the basis of the service braking demand AB. The first step ST1 and the second step ST2 may also be carried out in the opposite sequence or simultaneously. The service braking ratio value VB is preferably stated in the same units as the anti-jackknifing braking ratio value VS, such that the service braking ratio value can directly and without further conversion be compared or considered in relation to the anti-jackknifing braking ratio value VS. For this purpose, the service braking ratio value VB may for example contain a service braking target pressure pBZ or a service braking target value WBZ related to the service braking target pressure. The service braking target pressure pBZ (or service braking target value WBZ) is ascertained in the control unit 6, or in the switchover unit 6a, for example from the service braking actuation signal SZ using a service braking characteristic curve KB or the like.

Here, the service braking target pressure pBZ corresponds to the service braking brake pressure pBa, pBb, pBc that is normally pneumatically output to the respective service brakes 15a, 15b, 15c in the presence of the specified service braking demand AB. When an anti-jackknifing braking function SF is active, it is for example the case that the service braking target pressure pBZ continues to be output in the tractor vehicle 2 as a rear-axle service braking brake pressure pBb to the rear-axle service brakes 15b, whereas, when the switching valve 20 is in the second switching setting S2 (anti-jackknifing braking function SF active), the service braking target pressure is retained for the front axle VA. Owing to the select-high function implemented in the trailer control valve 11, the rear-axle control pressure pSb that is output in a manner dependent on the service braking demand AB is furthermore also transmitted via the trailer connector 12 to the trailer service brakes 15c, if the rear-axle control pressure is higher than the trailer service braking brake pressure pBc that is output in a manner dependent on the anti-jackknifing braking demand AS. Accordingly, under these circumstances, a correspondingly high service braking demand AB is also implemented by means of the trailer 3.

Subsequently, in a third step ST3, in a manner dependent on the two ratio values VS, VB, a switchover criterion UK is checked which indicates whether or not a switchover of the switching valve 20 from the second switching setting S2 (anti-jackknifing braking function SF active) into the first switching setting S1 (anti-jackknifing braking function SF inactive) can be performed. For this purpose, the ratio or the proportional relationship between the two ratio values VS, VB is considered. Here, the switchover criterion UK is satisfied if the service braking ratio value VB related to the demanded service braking demand AB exceeds a set (percentage) fraction G of the anti-jackknifing braking ratio value VS, that is, VB>G×VS.

The background to this is that a deactivation of the anti-jackknifing braking function SF by means of the switching valve 20 (switchover into the first switching setting S1) causes a front-axle service braking brake pressure pBa that directly corresponds to the service braking target pressure pBZ to be immediately output to the front-axle service brakes 15a and causes a corresponding trailer service braking brake pressure pBc to be immediately output to the trailer service brakes 15c, which leads to a pressure increase at least at the front-axle service brakes 15a and, depending on the magnitude of the service braking target pressure pBZ, also to a pressure change at the trailer service brakes 15c. This has repercussions on the driving dynamics of the vehicle combination 1 as a whole.

Here, the fraction G is initially set such that an outputting of the service braking brake pressures pBa, pBc is allowed not only when the service braking target pressure pBZ corresponds to the anti-jackknifing braking target pressure pSZ, for which reason the set fraction G is less than 1 (100%). A certain pressure change is thus allowed. At the same time, however, the fraction G should also be set such that an outputting of the service braking brake pressures pBa, pBc after a switchover of the switching valve 20 does not cause an excessive jerk (change in deceleration) in the vehicle combination 1, which unsettles the driver and/or can give rise to situations that are critical in terms of stability. The fraction G is therefore set for example to 0.5 (50%). Depending on the application and objective, fractions G of between 0.2 (20%) and 0.8 (80%) may however also be selected.

A switchover of the switching valve 20 is thus allowed only when the service braking target value WBZ or the service braking target pressure pBZ based on the actuation of the service brake valve 14 corresponds to at least half (with G=0.5 (50%)) of the anti-jackknifing braking target value WSZ or anti-jackknifing braking target pressure pSZ based on the actuation of the anti-jackknifing braking operator control unit 4, that is, if: VB>0.5×VS. This applies analogously to other selected fractions G. If the relevant ratio value VS, VB is defined in the form of a pressure, then in the third step ST3 it is checked whether the service braking target pressure pBZ corresponds at least to half (with G=0.5 (50%)) of the anti-jackknifing braking target pressure pSZ, that is, whether pBZ>0.5×pSZ. If so, the switchover criterion UK is satisfied, and the switching valve 20 can be safely and comfortably switched over into the first switching setting S1 in order to deactivate the anti-jackknifing braking function SF.

It is also equivalently possible to check whether the anti-jackknifing braking ratio value VS related to the demanded anti-jackknifing braking demand AS falls below a set multiple, corresponding to the inverse fraction G (1/G), for example 2 (200%), of the service braking ratio value VB, that is, whether VS<2×VB or pSZ<2×pBZ.

Consequently, in a fourth step ST4, a deactivation of the anti-jackknifing braking function SF as a result of a corresponding switching signal S20 being output to the switching valve 20 by the control unit 6 or by the switchover unit 6a implemented therein is allowed only when the switchover criterion UK has been satisfied in the preceding third step ST3. In that situation, it is thus no longer the anti-jackknifing braking demand AS but rather the service braking demand AB that is satisfied.

In order that the pressure change at the front axle VA does not have too intense or abrupt an effect on the relevant service braking target pressure pBZ, or in order to achieve as continuous as possible a transition, provision is additionally made whereby, at the same time as or after the switching valve 20 is switched over into the first switching setting S1, the ABS valves 7 at the front axle VA are actuated by the control unit 6 such that the intermediate pressure pZ in the sub-region 16a of the front-axle pressure line 16 changes with a specified pressure gradient dp of for example between 0.5 bar/s and 5 bar/s. The pressure gradient dp for the intermediate pressure pZ should in this case be based on the change in the pressure at the trailer control valve 11 in this situation, because less of a change in deceleration occurs in the case of a synchronous pressure change at the front axle VA and at the trailer 3.

Such a pressure gradient dp can be implemented by virtue of the ABS valves 7 being switched back and forth in pulsed fashion between the pressure-maintaining setting P1 and the pressure build-up setting P3. Accordingly, for a pulse time tP of for example 10 ms, the pressure build-up setting P3 is set by virtue of the relevant inlet valve 7a being opened, and subsequently, for an interval time tB of for example 50 ms, the pressure-maintaining setting P1 is set by virtue of the relevant inlet valve 7a being closed. The pulse times tP and interval times tB may in this case be read out from a pulse characteristic curve KP which has been taught in advance for the relevant ABS valve 7, and in which it is plotted what pulse times tP and interval times tB lead to what pressure change. In this way, the service braking target pressure pBZ or front-axle service braking brake pressure pBa prevailing in the front-axle pressure line 16 does not act immediately to the full extent as an intermediate pressure pZ in the sub-region 16a of the front-axle pressure line 16 and thus at the front-axle service brakes 15a, but does so only in delayed fashion by way of a continuous or stepped pressure build-up with the respectively specified pressure gradient dp.

In a similar method sequence, provision may also be made for a switch to be made from an inactive anti-jackknifing braking function SF to an active anti-jackknifing braking function SF while a service braking operation is already being performed owing to an actuation of the service brake valve 14. Accordingly, in the initial step ST0, it is initially checked whether both an actuation of the service brake valve 14 (service braking demand AB) and an actuation of the anti-jackknifing braking operator control element 4 (anti-jackknifing braking demand AS) are present. Then, in the first step ST1, the anti-jackknifing braking target pressure pSZ (or anti-jackknifing braking target value WSZ) is ascertained as an anti-jackknifing braking ratio value VS from the anti-jackknifing braking actuation signal SSB. In the second step ST2, the service braking ratio value VB is ascertained from the service braking target pressure pBZ (or service braking target value WBZ), which follows in turn from the service braking actuation signal SZ.

In the third step ST3, in a manner dependent on the ratio values VS, VB, it is ascertained whether the switchover criterion UK has been satisfied, that is, whether, in that situation, the service braking ratio value VB related to the demanded service braking demand AB falls below a set (percentage) fraction G of the anti-jackknifing braking ratio value VS, that is, whether VB<0.5×VS or pBZ<0.5 pSZ. Consideration may also be given here to hysteresis, that is, the fraction G is correspondingly adapted, for example to 0.4, for this switchover operation (inactive anti-jackknifing braking function SF to active anti-jackknifing braking function SF). This prevents an excessively frequent switchover in the event of variations in the service braking demand AB. It is also equivalently possible to check whether the anti-jackknifing braking ratio value VS related to the demanded anti-jackknifing braking demand AS exceeds a set multiple, corresponding to the inverse fraction G (1/G), for example 2 (200%), of the service braking ratio value VB, that is, whether VS>2×VB or pSZ>2×pBZ. This applies analogously in the case of a different set fraction G. Here, too, the hysteresis may be correspondingly taken into consideration.

If the switchover criterion UK has been satisfied, or if a switchover of the switching valve 20 from the first switching setting S1 (inactive anti-jackknifing braking function SF)

into the second switching setting S2 (active anti-jackknifing braking function SF) is possible or allowed with regard to safety and comfort, then in the fourth step ST4, the switching valve 20 is switched over from the first switching setting S1 into the second switching setting S2 by the control unit 6, or by the switchover unit 6a, by way of the switching signal S20 in order to correspondingly implement the anti-jackknifing braking demand AS and to satisfy the service braking demand AB only by means of the rear wheel service brakes 15b and, depending on magnitude (select-high), also by means of the trailer service brakes 15c, wherein the anti-jackknifing braking demand AS will generally be higher.

In order to avoid an abrupt withdrawal of the braking force that acts at the front-axle service brakes 15a owing to the actuation of the service brake valve 14 or the service braking demand AB before the switching valve 20 is switched over, the intermediate pressure pZ acting in the sub-region 16a of the front-axle pressure line 16 is reduced in stepped or continuous fashion, with a set pressure gradient dp, to an ambient pressure. For this purpose, at the same time as or after the switching valve 20 is switched over into the second switching setting S2, the ABS valves 7 at the front wheels 8a are switched over between the pressure-maintaining setting P1 and the pressure dissipation setting P2 in pulsed fashion in order to achieve a set pressure gradient dp. Here, too, for a set pressure gradient dp, the respective pulse times tP for the pressure dissipation setting P2 and interval times tB for the pressure-maintaining setting P1 are obtained from a pulse characteristic curve KP that has been taught for the relevant ABS valve 7.

It is understood that the foregoing description is that of the preferred embodiments of the invention and that various changes and modifications may be made thereto without departing from the spirit and scope of the invention as defined in the appended claims.

LIST OF REFERENCE DESIGNATIONS (PART OF THE DESCRIPTION)

1 Vehicle combination
2 Tractor vehicle
3 Trailer
4 Anti-jackknifing braking operator control unit
5 Brake system
5a Tractor vehicle part of the brake system 5
5b Trailer part of the brake system 5
6 Control unit
6a Switchover unit
7 ABS valves
7a Inlet valve
7b Outlet valve
8a Front wheel
8b Rear wheel
9 Axle modulator
10 Valve module
11 Trailer control valve
12 Trailer connector
13a First reservoir
13b Second reservoir
13c Third reservoir
14 Service brake valve
15a Front-axle service brake
15b Rear-axle service brake
15c Trailer service brakes
16 Front-axle pressure line
16a Sub-region of the front-axle pressure line
17 Rear-axle pressure line
18 Trailer pressure line
19 Relay valve
20 Switching valve
20a 3/2 directional valve
AB Service braking demand
AS Anti-jackknifing braking demand
G Fraction
HA Rear axle
KB Service braking characteristic curve
KP Pulse characteristic curve
KS Anti-jackknifing braking characteristic curve
P1 Pressure-maintaining setting of the ABS valve 7
P2 Pressure dissipation setting of the ABS valve 7
P3 Pressure build-up setting of the ABS valve 7
pBa Front-axle service braking brake pressure
pBb Rear-axle service braking brake pressure
pBc Trailer service braking brake pressure
pBZ Service braking target pressure
pSa Front-axle control pressure
pSb Rear-axle control pressure
pSI Anti-jackknifing braking actual pressure
pSZ Anti-jackknifing braking target pressure
pVa Reservoir pressure of the first reservoir 13a
pVb Reservoir pressure of the second reservoir 13b
pVc Reservoir pressure of the third reservoir 13c
SSB Anti-jackknifing braking actuation signal
SZ Service braking actuation signal
S1 First switching setting of the switching valve 20
S2 Second switching setting of the switching valve 20
S20 Switching signal
SF Anti-jackknifing braking function
tB Interval time
tP Pulse time
UK Switchover criterion
VA Front axle
VB Service braking ratio value
VS Anti-jackknifing braking ratio value
WBZ Service braking target value
WSZ Anti-jackknifing braking target value

The invention claimed is:

1. A method for controlling a brake system of a vehicle combination including a tractor vehicle and a trailer, wherein a service braking demand is configured to be received via a service brake valve of the brake system and an anti-jackknifing braking demand is configured to be received via an anti-jackknifing braking operator control unit of the brake system, wherein the anti-jackknifing braking operator control unit is distinct from said service brake valve, wherein the anti-jackknifing braking demand is implemented, with an anti-jackknifing braking function active, by pneumatic actuation of trailer service brakes of the trailer in order to straighten the vehicle combination, wherein the service braking demand is implemented, with the anti-jackknifing braking function inactive, by pneumatic actuation of front-axle service brakes of the tractor vehicle, of rear-axle service brakes of the tractor vehicle and of the trailer service brakes of the trailer in order to brake the vehicle combination, wherein a switching valve is configured to be switched over between a first switching setting, in which the anti-jackknifing braking function is inactive, and a second switching setting, in which the anti-jackknifing braking function is active, wherein the switching valve in the second switching setting outputs a reservoir pressure, which prevails in a reservoir, via a front-axle pressure line into a trailer pressure line, which leads to a trailer control valve, in order to pneumatically actuate the trailer service brakes in a manner dependent on the received anti-jackknifing braking demand, wherein ABS valves, which are each connected upstream of the front-axle service brakes of the tractor vehicle in the front-axle pressure line, are moved into a pressure-maintaining setting if the second switching setting of the switching valve is set, such that the reservoir pressure acting in the front-axle pressure line is not output to the front-axle service brakes, the method comprising:

when the service braking demand and the anti-jackknifing braking demand are simultaneously present:

determining an anti-jackknifing braking ratio value and a service braking ratio value, wherein the anti-jackknifing braking ratio value is formed in a manner dependent on the anti-jackknifing braking demand and the service braking ratio value is formed in a manner dependent on the service braking demand; and, checking a switchover criterion in a manner dependent on the anti-jackknifing braking ratio value and the service braking ratio value, wherein the switchover criterion is satisfied if the service braking ratio value exceeds a specified fraction of the anti-jackknifing braking ratio value when the anti-jackknifing braking function is active or falls below the specified fraction when the anti-jackknifing braking function is inactive; and, if the switchover criterion is satisfied, the switching valve is switched over:

from the first switching setting into the second switching setting in order to activate the anti-jackknifing braking function and implement the anti-jackknifing braking demand, or from the second switching setting into the first switching setting in order to deactivate the anti-jackknifing braking function and implement the service braking demand.

2. The method of claim 1, wherein, when the service braking demand and the anti-jackknifing braking demand are simultaneously present, and with the anti-jackknifing braking function active, in the tractor vehicle only the rear-axle service brakes are pneumatically actuated in a manner dependent on the service braking demand.

3. The method of claim 1, wherein the switching valve in the first switching setting, with the anti-jackknifing braking function inactive, outputs a front-axle control pressure, which is output by the service brake valve on a basis of the service braking demand, with a boosted air flow rate into the front-axle pressure line and into the trailer pressure line that leads to the trailer control valve.

4. The method of claim 1, wherein the ABS valves are each configured to:

be moved into the pressure-maintaining setting in order to maintain an intermediate pressure that prevails in a sub-region of the front-axle pressure line between the relevant ABS valve and the relevant front-axle service brakes; or be moved into a pressure dissipation setting in order to reduce the intermediate pressure; or be moved into a pressure build-up setting in order to adapt the intermediate pressure to the pressure that is output by the switching valve into the front-axle pressure line.

5. The method of claim 4, wherein, before or after the switching valve is switched over from the first switching setting, with the anti-jackknifing braking function inactive, into the second switching setting in order to activate the anti-jackknifing braking function, the ABS valves, which are each connected upstream of the front-axle service brakes, are moved alternately into the pressure dissipation setting and the pressure-maintaining setting in order to reduce the intermediate pressure, which acts at the front-axle service brakes, with a specified pressure gradient, wherein the pressure-maintaining setting is subsequently held for as long as the second switching setting of the switching valve is set, or as or after the switching valve is switched over from the second switching setting, with the anti-jackknifing braking function active, into the first switching setting in order to deactivate the anti-jackknifing braking function, the ABS valves, which are in each case connected upstream of the front-axle service brakes, are moved alternately into the pressure build-up setting and the pressure-maintaining setting in order to increase the intermediate pressure, which acts at the front-axle service brakes, with a specified pressure gradient.

6. The method of claim 5, wherein the ABS valves are moved alternately into the pressure dissipation setting for a pulse time and into the pressure-maintaining setting for an interval time in order to reduce the intermediate pressure, which acts at the front-axle service brakes, with the specified pressure gradient, or are moved alternately into the pressure build-up setting for the pulse time and into the pressure-maintaining setting for the interval time in order to increase the intermediate pressure, which acts at the front-axle service brakes, with the specified pressure gradient.

7. The method of claim 6, wherein a relationship between the relevant pressure gradient and the pulse time and the interval time is stored in a pulse characteristic curve.

8. The method of claim 1, wherein the anti-jackknifing braking ratio value is specified by an anti-jackknifing braking actual pressure, which is output to the trailer service brakes, or by an anti-jackknifing braking target pressure or anti-jackknifing braking target value that characterizes the anti-jackknifing braking demand, wherein the anti-jackknifing braking target pressure or anti-jackknifing braking target value is read out from a stored anti-jackknifing braking characteristic curve.

9. The method of claim 1, wherein the service braking ratio value is specified by a service braking target pressure, which characterizes the service braking demand, or a service braking target value, wherein the service braking target pressure or service braking target value is read out from a stored service braking characteristic curve.

10. The method of claim 1, wherein the specified fraction is between 0.2 and 0.8, such that the switchover criterion is satisfied if, in a presence of the service braking demand and the anti-jackknifing braking demand simultaneously, the service braking ratio value deviates from the anti-jackknifing braking ratio value by more than the specified fraction.

11. The method of claim 10, wherein the specified fraction is 0.5.

12. The method of claim 1, wherein the reservoir pressure which, when the switching valve is in the second switching setting, is output via the front-axle pressure line into the trailer pressure line that leads to the trailer control valve is modulated in accordance with the anti-jackknifing braking demand.

13. The method of claim 1, wherein the reservoir pressure which, when the switching valve is in the second switching setting, is output via the front-axle pressure line into the trailer pressure line that leads to the trailer control valve is modulated in accordance with the anti-jackknifing braking demand via a valve module arranged in the trailer pressure line.

14. A brake system of a vehicle combination including a tractor vehicle and a trailer, the brake system comprising:

a service brake valve configured to receive a service braking demand;

an anti-jackknifing braking operator control unit distinct from said service brake valve and configured to receive an anti-jackknifing braking demand;

front-axle service brakes and rear-axle service brakes arranged in the tractor vehicle and trailer service brakes arranged in the trailer;

ABS valves connected upstream of said front-axle service brakes of the tractor vehicle in a front-axle pressure line;

a switching valve, which in a first switching setting fluidically connects said front-axle pressure line to said service brake valve in order to implement the service braking demand and in a second switching setting fluidically connects the front-axle pressure line to a reservoir in order to implement the anti-jackknifing braking demand;

a trailer pressure line branching off from said front-axle pressure line and leading to a trailer control valve, such that, when said switching valve is in said second switching setting, a reservoir pressure prevailing in the reservoir can be pneumatically output via the trailer control valve to the trailer service brakes; and, a control unit configured to move said ABS valves into a pressure-maintaining setting if said second switching setting of said switching valve is set, such that the reservoir pressure acting in said front-axle pressure line is not output to said front-axle service brakes;

said control unit being further configured such that:

in the presence of a service braking demand and an anti-jackknifing braking demand simultaneously, said control unit is configured to ascertain an anti-jackknifing braking ratio value and a service braking ratio value;

said control unit is configured to check a switchover criterion in a manner dependent on said anti-jackknifing braking ratio value and said service braking ratio value, wherein said switchover criterion is satisfied if said service braking ratio value exceeds a specified fraction of the anti-jackknifing braking ratio value when the anti-jackknifing braking function is active or falls below said specified fraction when the anti-jackknifing braking function is inactive; and, if the switchover criterion is satisfied, said control unit causes the switching valve to be switched over:

from the first switching setting into the second switching setting in order to activate an anti-jackknifing braking function and implement the anti-jackknifing braking demand, or from the second switching setting into the first switching setting in order to deactivate the anti-jackknifing braking function and implement the service braking demand.

15. The brake system of claim 14, wherein at least one of:
said anti-jackknifing braking ratio value is formed in a manner dependent on the anti-jackknifing braking demand; and,
said service braking ratio value is formed in a manner dependent on the service braking demand.

16. The brake system of claim 14, wherein said switching valve is a 3/2 directional valve.

17. The brake system of claim 14 further comprising a valve module arranged in said trailer pressure line in order to modulate the reservoir pressure which, when said switching valve is in said second switching setting, is introduced into said front-axle pressure line and said trailer pressure line, wherein said valve module is electrically actuatable by said control unit in a manner dependent on said anti-jackknifing braking demand.

18. The brake system of claim 14, wherein said anti-jackknifing braking operator control unit is a continuously variably settable operator control lever.

19. A vehicle combination comprising the brake system of claim 14.

* * * * *